US011389950B2

(12) United States Patent
Röder

(10) Patent No.: US 11,389,950 B2
(45) Date of Patent: Jul. 19, 2022

(54) SORTING SYSTEM FOR A MACHINE TOOL, MACHINE TOOL AND METHOD FOR SORTING CUT PARTS

(71) Applicant: Bystronic Laser AG, Niederönz (CH)

(72) Inventor: Sebastian Röder, Bern (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/594,479

(22) PCT Filed: Jun. 2, 2020

(86) PCT No.: PCT/EP2020/000112
§ 371 (c)(1),
(2) Date: Oct. 18, 2021

(87) PCT Pub. No.: WO2020/244800
PCT Pub. Date: Dec. 10, 2020

(65) Prior Publication Data
US 2022/0143811 A1    May 12, 2022

(30) Foreign Application Priority Data

Jun. 7, 2019   (DE) ..................... 10 2019 115 634.3

(51) Int. Cl.
*B25J 9/02* (2006.01)
*B25J 15/00* (2006.01)
(Continued)

(52) U.S. Cl.
CPC ........... *B25J 9/023* (2013.01); *B23K 26/0876* (2013.01); *B23K 26/38* (2013.01); *B23K 26/40* (2013.01);
(Continued)

(58) Field of Classification Search
CPC ...... B25J 9/0087; B25J 9/0093; B25J 9/0096; B25J 9/023; B25J 9/026; B25J 9/1682;
(Continued)

(56) References Cited

U.S. PATENT DOCUMENTS

| 4,781,517 | A | 11/1988 | Pearce et al. |
| 5,102,292 | A | 4/1992 | Brinker et al. |

(Continued)

FOREIGN PATENT DOCUMENTS

EP   3144255 A1   3/2017

OTHER PUBLICATIONS

European Patent Office, International Search Report and Written Opinion, from PCT/EP2020/000112 filed Jun. 2, 2020, dated Oct. 2, 2020.

(Continued)

*Primary Examiner* — Dean J Kramer
(74) *Attorney, Agent, or Firm* — Workman Nydegger

(57) ABSTRACT

The invention relates to a sorting system (100) for a machine tool for separating parts, in particular a laser cutting machine (200), having a gripper (110) that can be moved over a workpiece region (30) and is configured to receive cut parts (10) from the workpiece region (30), and an intermediate store (120) that can be moved over the workpiece region (30) and is configured to receive cut parts (10) from the gripper (110) and to unload the cut parts (10) into a store (40).

9 Claims, 3 Drawing Sheets

(51) Int. Cl.
- *B23K 26/08* (2014.01)
- *B23K 26/30* (2014.01)
- *B23K 26/40* (2014.01)
- *B23K 26/70* (2014.01)
- *B23K 37/02* (2006.01)
- *B23K 37/04* (2006.01)
- *B23K 26/38* (2014.01)
- *B25J 15/04* (2006.01)
- *B25J 15/06* (2006.01)
- *B25J 18/02* (2006.01)
- *B25J 9/00* (2006.01)
- *B23K 103/04* (2006.01)
- *B23K 101/18* (2006.01)

(52) U.S. Cl.
CPC ........ *B23K 26/702* (2015.10); *B23K 37/0235* (2013.01); *B23K 37/0408* (2013.01); *B25J 9/0087* (2013.01); *B25J 9/0096* (2013.01); *B25J 15/0014* (2013.01); *B25J 15/0061* (2013.01); *B25J 15/04* (2013.01); *B25J 15/0616* (2013.01); *B25J 18/025* (2013.01); *B23K 2101/18* (2018.08); *B23K 2103/04* (2018.08)

(58) Field of Classification Search
CPC .. B25J 18/025; B23K 26/702; B23K 37/0408; B23Q 7/1494; B21D 43/20
USPC ....... 414/797, 796.9, 331.14, 331.16, 331.18
See application file for complete search history.

(56) References Cited

U.S. PATENT DOCUMENTS

| | | | | |
|---|---|---|---|---|
| 5,192,848 | A * | 3/1993 | Miyakawa | B23Q 7/1421 219/121.63 |
| 5,275,527 | A | 1/1994 | Turra et al. | |
| 5,359,175 | A * | 10/1994 | Miyagawa | B65G 1/0407 219/121.63 |
| 5,373,136 | A * | 12/1994 | Ernst | B23K 26/0823 219/121.82 |
| 5,564,893 | A * | 10/1996 | Tacchi | B65G 47/902 414/797 |
| 9,713,858 | B2 * | 7/2017 | Yang | B23K 37/0408 |
| 2005/0072767 | A1* | 4/2005 | Leibinger | B23K 37/0229 219/121.82 |
| 2014/0216223 | A1 | 8/2014 | Epperlein | |
| 2014/0290453 | A1 | 10/2014 | Buettner et al. | |
| 2018/0079082 | A1 | 3/2018 | Takahashi et al. | |
| 2018/0155129 | A1 | 6/2018 | Lagziel et al. | |

OTHER PUBLICATIONS

European Patent Office, International Preliminary Report on Patentability, from PCT/EP2020/000112 filed Jun. 2, 2020, dated Sep. 16, 2021.

* cited by examiner

SORTING SYSTEM FOR A MACHINE TOOL, MACHINE TOOL AND METHOD FOR SORTING CUT PARTS

The invention relates to a sorting system for a machine tool, a machine tool and a method for sorting cut parts. In particular, the invention relates to a sorting system for a machine tool, a machine tool, and a method for sorting cut parts.

A machine tool is used to manufacture and machine workpieces. In this context, machine tools are considered to be, for example, sheet metal processing machines, in particular laser cutting machines or fluid cutting machines. For the sake of clarity, reference is made below to laser cutting machines. In this context, workpieces are considered to be metallic workpieces, in particular sheet metal plates or alternatively pipes. The machine tool produces cut parts from these workpieces.

Due to increasing machine performance and therefore shorter machining times for machine tools, a sorting system may not be able to sort the finished cut parts within the required machining time of the machine tool. It is therefore possible that the machine may have to wait for the sorting system.

The object of the invention is to avoid the disadvantages of the prior art and to provide an improved sorting system for a machine tool, an improved machine tool or an improved method for sorting cut parts.

The invention relates to a sorting system for a machine tool, a machine tool and a method for sorting cut parts. In particular, the invention relates to a sorting system for a machine tool, a machine tool, and a method for sorting cut parts.

The sorting system according to the invention for a machine tool for separating parts, in particular a laser cutting machine, comprises a gripper that can be moved over a workpiece region and is configured to receive cut parts from the workpiece region, and an intermediate store that can be moved over the workpiece region and is configured to receive cut parts from the gripper and to unload the cut parts into a store.

The sorting system according to the invention is configured for sorting or receiving and removing cut parts. It consists of a gripper and an intermediate store. Cut parts can be stacked with a gripper on a movable intermediate store during sorting. The intermediate store with the stacked parts can then be moved to the store or storage location and deposit the stacked parts there together. This saves travel distances and therefore time when sorting. The gripper can be configured to work mechanically, magnetically and/or with negative pressure.

By using an intermediate store on the sorting system, the travel distances are reduced when sorting. Not every part is transported individually to the storage location and deposited there, which results in long travel distances. When loading the parts to the intermediate store, the gripper only has to cover very short travel distances, which reduces the sorting time. When the intermediate store is full, a plurality of parts are moved to the storage location at the same time, which significantly reduces the sorting time. In particular with small parts and/or parts that have a short machining time in the machine, a time saving of 50% can be achieved during sorting. The sorting system can be used wherever a sorting system is used and sorting time can be saved by having to transport a plurality of parts further distances at the same time.

The store or storage location itself can be a hall floor or an aid for the onward transport of the produced parts, such as conveyor belts, tables, trolleys, pallets or other devices.

A controller of the sorting system can receive information such as a cutting plan or the number, size and arrangement of the cut parts from the controller of the machine tool or a higher-level controller, in particular for route planning and route optimisation.

It can be provided that the gripper and the intermediate store are arranged on a carrier element that can be moved in a first direction and that the gripper and the intermediate store are arranged to be movable on the carrier element independently of one another in a second direction, wherein the first and the second direction lie in one plane of the workpiece region. This can be a portal arrangement, wherein the carrier element can be moved in the direction of the material flow of the uncut workpiece. Portal arrangements of this type allow efficient processing with little construction effort.

It can further be provided that the gripper and the intermediate store can be moved in a direction perpendicular to a plane of the workpiece region. The perpendicular direction usually corresponds to the vertical and allows cut parts to be received even from different positions. The height of the intermediate store can be adjusted depending on the load level for easier loading by the gripper. The gripper and the intermediate store can be modular.

It can be provided that the gripper and the intermediate store are each arranged on a telescopic arm that can be moved in the direction perpendicular to the plane of the workpiece region. Using a telescopic arm, the gripper and the intermediate store can be moved easily and reproducibly.

It can further be provided that the gripper and the intermediate store are arranged together on a telescopic arm that can be moved in the direction perpendicular to the plane of the workpiece region. The construction can be simplified in this way. It can then be provided that the gripper and/or the intermediate store can move relative to one another for loading the intermediate store, for example on a translatory axis. More than one of these units of telescopic arm with gripper and intermediate store can also be arranged on the carrier element.

It can be provided that the gripper and the intermediate store are arranged on the telescopic arm by means of a releasable coupling. A coupling allows the components to be changed quickly, for example when changing the workpiece of the machine tool. This can increase the flexibility of the sorting system. An automatic coupling is possible, with which the gripper and/or the intermediate store can be changed automatically at a changing station.

It can further be provided that the intermediate store has a sliding device that is configured to push cut parts out of the intermediate store. The loaded parts can thus be moved from the intermediate store to a storage area of the store by means of a mechanical, electrical or pneumatic device. This enables the cut parts to be deposited even on flat surfaces.

It can be provided that the intermediate store has a contact surface formed from a plurality of tines for the cut parts. The contact surface of the intermediate store therefore consists of individual tines, similar to a fork. The cut parts from the intermediate store are deposited at the storage location on prepared blocks, between which the tines of the intermediate store are inserted. Since the blocks are higher than the tines, the cut parts can be deposited on the blocks from the intermediate store. The contact surface of the intermediate store, i.e. the tines and/or the spaces between the tines, can be adapted for different part sizes, so that small sheet metal parts can also be stored. The intermediate store can be provided with a base for the cut parts so that no cut parts fall through the gaps of the intermediate store.

It can further be provided that the intermediate store has a container for the cut parts. The intermediate store can be provided with containers such as collecting containers or with containers with compartments for individual products, into which sorting takes place directly. For example, a pallet can also be used as an intermediate store. The entire container with the cut parts can then be deposited at the storage location. This means that the cut parts no longer have to be packed into containers later, should this be necessary.

The centre of gravity of the intermediate store may be centric. The intermediate store may be constructed that its centre of gravity is on the virtual extension of the telescopic axis of the sorting system. As a result, the coupling to the sorting system is subjected to the lowest torque load.

The intermediate store may be arranged on the first telescopic arm of the sorting system. The gripper for loading and unloading the intermediate store may be arranged on a second telescopic arm of the intermediate store.

The intermediate store and the gripper can be rotated independently of one another on their own perpendicular axis.

The contact surface of the intermediate store may consist of individual tines. The tines may be attached to a crossbar at one end. The other end of the tines may be open. The individual tines can be positioned and fastened differently on the crossbar, depending on the part size and the number of stacked parts required. Another bar perpendicular to the crossbar may be attached thereto. Another bar may be arranged at an angle on this perpendicular bar. This design provides the largest possible space for parts on the intermediate store, with the lowest possible moment load on the coupling to the telescopic arm. The angled bar on the intermediate store also creates the necessary space so that the gripper, which is arranged on the second telescopic arm, can load and unload parts onto the intermediate store.

The gripper may consist of a crossbar to which the suction cups or other grippers are attached. The suction cups can be arranged anywhere on the crossbar, depending on the part size and shape. There may be an angled bar on the crossbar. The angled bar is required to load and unload the intermediate store. At the end of the angled bar may be the coupling to the telescopic arm.

The maximum distance from the first telescopic arm and from the second telescopic arm to one another may be determined by the size of the bridge of the sorting system. The minimum distance from the first telescopic arm and from the second telescopic arm to one another may be defined by a necessary safety region. This may consist of a software-based safety distance and mechanical buffers.

The minimum distance between the intermediate store and the gripper may be determined by a software-based safety distance. This can be very small, e.g. 0.5 mm, since only the positioning accuracy of the telescopic arms has to be considered to avoid a collision.

The contact surface of the intermediate store and the stacking height of the parts on the intermediate store may be determined by the design of the intermediate store. In the example, the contact surface may be 400×600 mm and a stack height of 200 mm could be possible. It is conceivable to develop intermediate stores of different sizes, depending on requirements. The maximum size may be determined by the maximum weight (unladen weight+parts) that the telescopic arm of the sorting system can carry.

A machine tool according to the invention, in particular a laser cutting machine, is configured for separating cut parts from a workpiece and comprises a sorting system as described above. The same advantages and modifications apply as described above. For example, the sorting system can be arranged on a changing table of the machine tool.

A method according to the invention for sorting cut parts from a workpiece region of a machine tool, in particular a laser cutting machine, comprises the steps of Moving a gripper to receive a cut part;

Depositing the cut part in an intermediate store that can be moved over the workpiece region; and Moving the intermediate store to a store and unloading the intermediate store.

The same advantages and modifications apply as described above.

It can be provided that the moving and the depositing steps are repeated until the intermediate store is filled or all cut parts have been received. This allows a maximum reduction in the travel distances for sorting the cut parts.

It can also be provided that the intermediate store follows the movement of the gripper. The following can take place along the carrier element and/or in height. In this way, the travel time of the gripper and thus the time for collecting or receiving the cut parts can be reduced.

It can be provided that the cut part(s) are fixed in the intermediate store. Using a fixing device, cut parts such as a stack of sheet metal parts can be fixed in such a way that faster accelerations can be achieved, which shortens the unloading time. The fixation can be achieved, for example, by means of mechanically operated jaws or by a cable-rod construction.

Further preferred embodiments of the invention will become apparent from the remaining features mentioned in the dependent claims.

The various embodiments of the invention mentioned in this application can, unless otherwise stated in individual cases, be advantageously combined with one another.

The invention will be explained below in exemplary embodiments with reference to the accompanying drawings, wherein.

Figure 1:
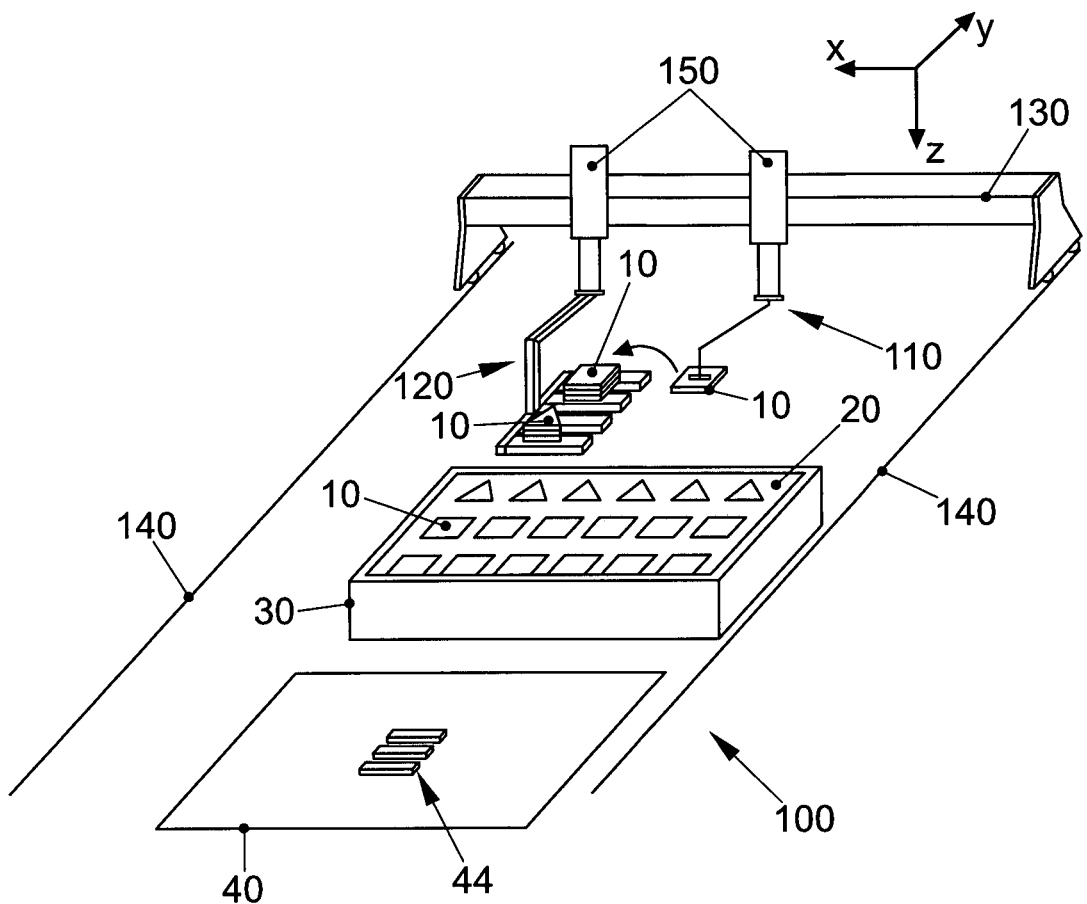
FIG. 1 shows a perspective view of a sorting system for a machine tool.

FIG. 1 shows a sorting system 100 for a machine tool for separating parts, in particular a laser cutting machine. The sorting system 100 is used for sorting cut parts 10 that have been cut out of a workpiece 20, for example, and are arranged in a workpiece region 30, for example on a grate or changing table.

The sorting system 100 comprises a gripper 110 that can be moved over the workpiece region 30 and is configured to receive a cut part 10 from the workpiece region 30, and an intermediate store 120 that can be moved over the workpiece region 30 and is configured to receive cut parts 10 from the gripper 110 and to unload the cut parts 10 into a store 40.

The gripper 110 and the intermediate store 120 are arranged on a portal arm or carrier element 130 that can be moved in a Y direction. For this purpose, the carrier element 130 can, for example, be arranged to be movable on rails 140.

The gripper 110 and the intermediate store 120 are arranged on the carrier element 130 such that they can be moved in an X direction independently of one another. The X direction and the Y direction span a plane in which the workpiece region 30 lies or lies parallel thereto.

The gripper 110 and the intermediate store 120 are each arranged on a telescopic arm 150 that can be moved in a Z direction perpendicular to the plane of the workpiece region 30.

Thus, the gripper 110 and the intermediate store 120 can each be moved in three axes in order to sort the cut parts 10. The gripper 110 travels to a cut part 10, receives a cut part 10, for example with one or more suction caps or suction feet, travels to the intermediate store 120 and deposits the cut part 10 in the intermediate store 120. The gripper 110 may also comprise a plurality of gripping elements, such as suction caps, gripping elements, etc., so that more than one cut part 10 can be received at the same time.

The intermediate store 120 may, as shown, have several stacks or areas for different cut parts 10. The gripper 110 can also be designed to be rotatable about the Z direction in order to better sort the cut parts 10 on the intermediate store 120, for example to deposit the cut parts 10 with an identical orientation in the intermediate store 120.

When the intermediate store 120 is filled or all of the cut parts 10 have been received, the intermediate store 120 moves to the store 40, where the received cut parts 10 are unloaded from the intermediate store 120 into the store 40.

Figure 2:
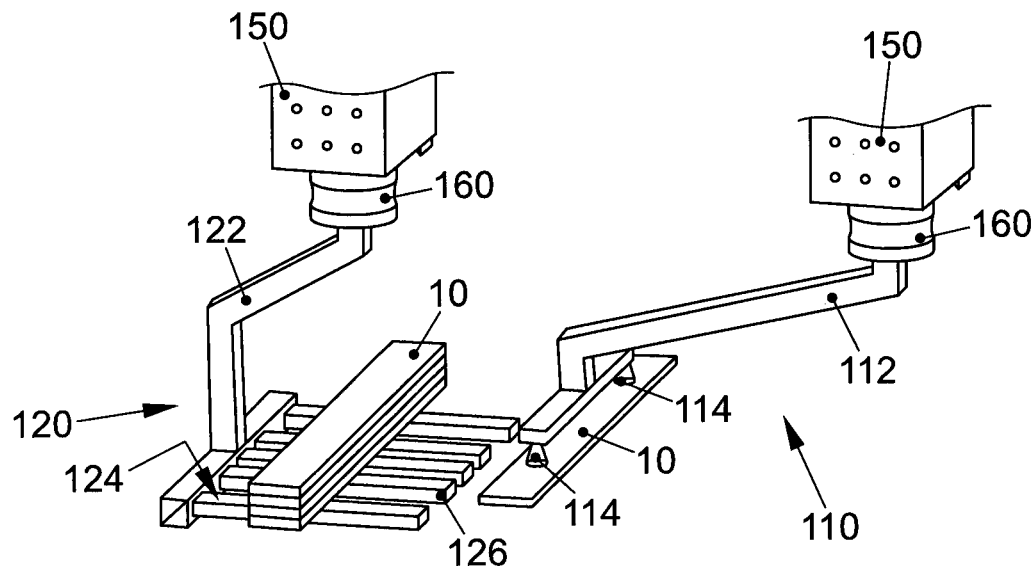
FIG. 2 shows a perspective view of a gripper and an intermediate store according to a first exemplary embodiment of the sorting system.

FIG. 2 shows a perspective view of a gripper 110 and an intermediate store 120, which are each arranged on a telescopic arm 150. The gripper 110 and the intermediate store 120 are each arranged on the telescopic arm 150 by means of a releasable coupling 160. Depending on the cut parts 10 to be sorted, different grippers 110 and/or intermediate stores 120 can be used.

The gripper 110 has a base body 112 that is connected to a part of the coupling 160. The other part of the coupling 160 is connected to the telescopic arm 150. A gripping element 114 having suction caps is arranged on the base body 112, so that a cut part 10 can be held and transported by means of negative pressure.

The intermediate store 120 has a base body 122 that is connected to a part of the coupling 160. The other part of the coupling 160 is connected to the telescopic arm 150. The intermediate store 120 has a contact surface 124 for the cut parts 10 that is formed from a plurality of tines 126. The tines 126 run parallel and form a grate for the cut parts 10.

Figure 3:
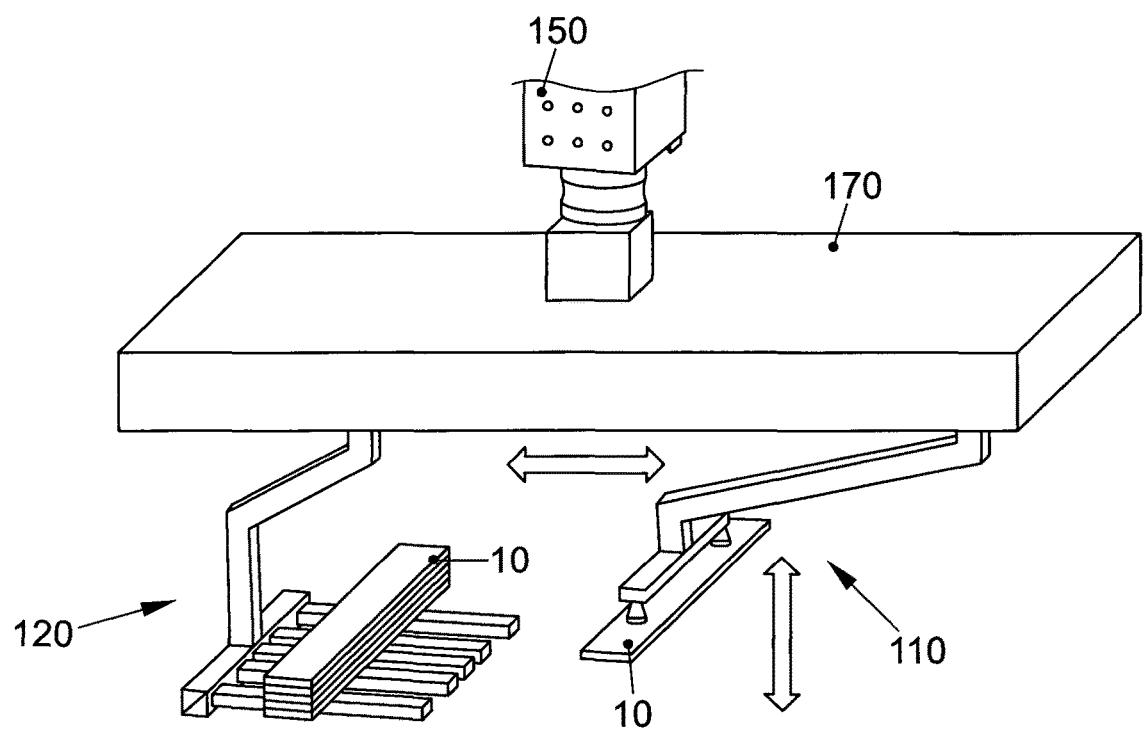
FIG. 3 shows a perspective view of a gripper and an intermediate store according to a second exemplary embodiment of the sorting system.

FIG. 3 shows a perspective view of a gripper 110 and an intermediate store 120 that are arranged together on a telescopic arm 150. The gripper 110, the intermediate store 120 and/or the telescopic arm 150 can be configured as shown in FIG. 2. A coupling may also be provided.

The gripper 110 and the intermediate store 120 are arranged on the telescopic arm 150 by means of an intermediate carrier 170. The gripper 110 can be moved vertically, i.e. in the Z direction, in order to receive the cut parts 10. Furthermore, the gripper 110 can be moved horizontally, i.e. in the X direction, in order to deposit the cut parts 10 in the intermediate store 120. The intermediate store 120 may have a continuous rear wall that serves as a stop or safeguard for the cut parts 10.

Figure 4:
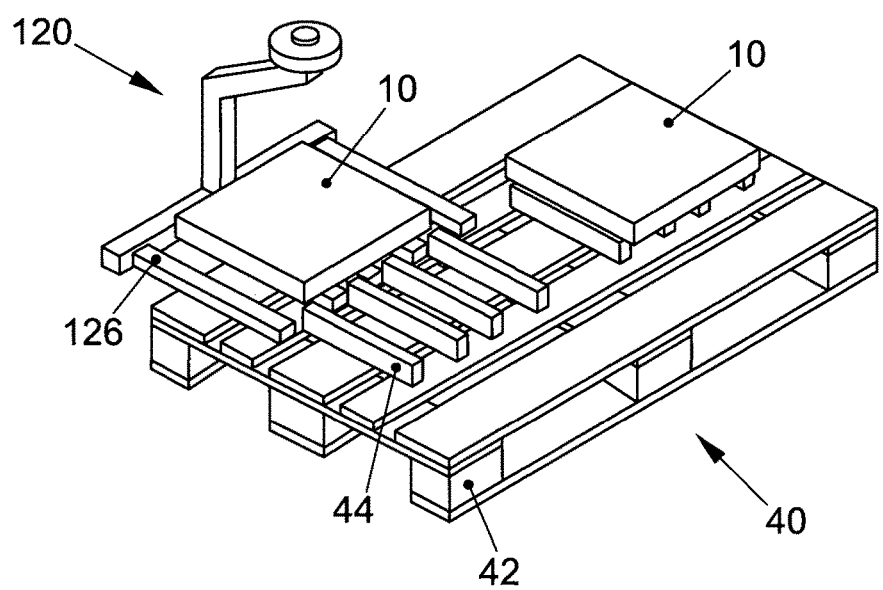
FIG. 4 shows a perspective view of an intermediate store and a store.

FIG. 4 shows a perspective view of the intermediate store 120 during the unloading of cut parts 10 into a store 40. The store 40 in this example consists of a pallet 42 on which several elongated storage blocks 44 are arranged. The storage blocks 44 are complementary to the tines 126 of the intermediate store 120. Thus, the tines 126 can move between the storage blocks 44 and, by lowering the intermediate store 120, the cut parts 10 can be deposited on the storage blocks 44.

Figure 5:
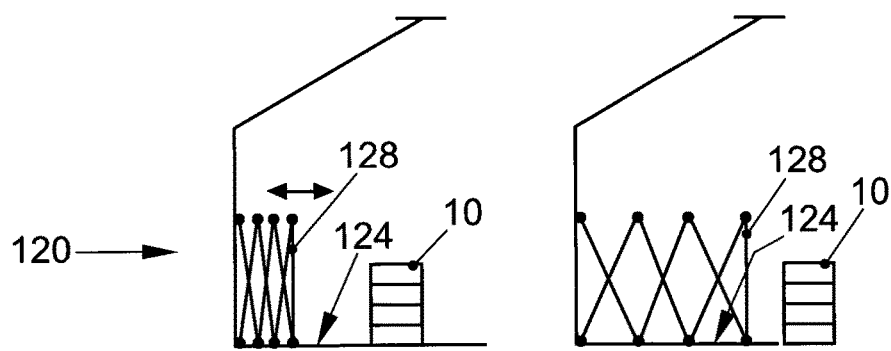
FIG. 5 shows a schematic view of an intermediate store having a sliding device for unloading.

FIG. 5 shows a schematic view of an intermediate store 120 having a sliding device 128 for unloading the cut parts 10. The sliding device 128 comprises, for example, a movable telescopic mechanism for pushing the cut parts 10 from the contact surface 124, i.e. from the intermediate store 120. In this way, the cut parts 10 can be unloaded into any store. The sliding device 128 can be moved, for example, via a motor drive (not shown in the figures).

Figure 6:
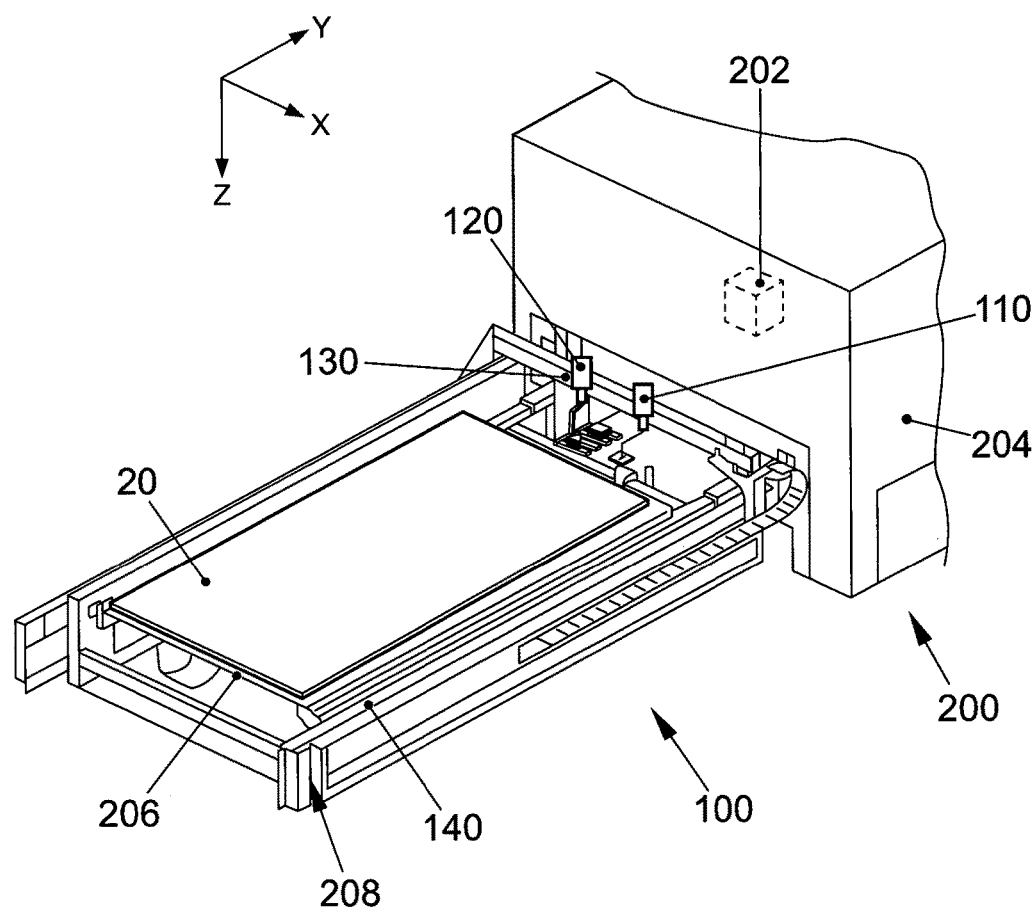
FIG. 6 shows a perspective view of a machine tool having a sorting system.

FIG. 6 shows a perspective view of a machine tool in the form of a laser cutting machine 200 having a sorting system 100.

The laser cutting machine 200 comprises a laser cutting head 202 configured for cutting parts from a metallic workpiece 20 that is plate-shaped in this case. The laser cutting machine 200 is equipped with the sorting system 100. The laser cutting machine 200 or the laser cutting head 202 is configured to cut workpieces 20, such as steel sheets or metal plates. For this purpose, a laser cutting power in the range of usually at least 1 kW, preferably greater than or equal to 3 kW is provided. The laser cutting head 202 is arranged in a laser processing area 204.

A changing table 206 of the laser cutting machine 200 is provided for receiving at least one workpiece 20. The laser cutting machine 200 further has a changing station 208 for the changing table 206, which is arranged outside the laser processing area.

The carrier element 130 of the sorting system 100 is arranged to be moveable on the changing station 208 by means of the changing table 206. The changing table 206 here corresponds to the workpiece region of the sorting system 100, or the workpiece region of the sorting system 100 is limited by the dimensions of the changing station 208.

The movable carrier element 130 moves on rails 140 that are attached to the longitudinal supports of the changing station 208. This allows the sorting system 100 to be moved in the Y direction, i.e. in the direction of the workpiece movement or the laser processing area 204. As described above, both the gripper 110 and the intermediate store 120 can be moved over the workpiece region by means of the carrier element 130 in order to sort cut parts.

The sorting system 100 may be controlled by a controller of the laser cutting machine 200 or connected to the controller. In this way, information such as the positions of the cut parts to be sorted or a cutting plan can be transmitted and/or the processing steps and times of the two machines can be coordinated.

According to a method for sorting cut parts from a workpiece region of a machine tool, in particular a laser cutting machine, the following steps can be carried out.

First, the gripper 110 is moved to a cut part 10 to receive the same. The travel distances of the gripper 110 can be planned in a way that is distance-optimised and therefore time-optimised. Data from the controller of the laser cutting machine 200 and/or sensor data, for example from a camera, can be used as the basis for this planning.

The received cut part 10 is deposited in the intermediate store 120 that can be moved over the workpiece region. The intermediate store 120 may follow the movement of the gripper. Depending on the position of the intermediate store 120, the gripper 110 moves to the intermediate store 120 to deposit the cut part 10.

The cut part(s) 10 may be fixed in the intermediate store 120. In this way, greater accelerations can be achieved when travelling over the workpiece region and to the store 40, as a result of which the sorting of the cut parts 10 from the workpiece region can be accelerated.

The movement of the gripper 110 and the depositing of the cut part(s) 10 can be repeated until the intermediate store 120 is filled or until all cut parts 10 have been received.

The intermediate store 120 is then moved to a store 40. There, the cut parts 10 are unloaded from the intermediate store 120 into the store 40. The sorting can then begin again. If other cut parts are now sorted, it may be necessary to change the gripper 110 and the intermediate store 120 by means of the coupling.

The sorting system presented here allows for a quick sorting of cut parts, so that the efficiency during cutting processes can be increased.

The invention claimed is:

1. A sorting system for a laser cutting machine, the sorting system having a controller for controlling the sorting system and having a gripper that can be moved over a workpiece region and is configured to receive cut parts from the workpiece region, and an intermediate store that can be moved over the workpiece region and is configured to receive cut parts from the gripper and to unload the cut parts into a store, wherein the gripper and the intermediate store are arranged on a carrier element that can be moved on rails in a first direction, characterized that the gripper and the intermediate store are arranged to be movable on the carrier element independently of one another in a second direction, wherein the first and the second direction lie in one plane of the workpiece region, the plane of the workpiece region being a plane in which the workpiece region lies or parallel thereto, and that the gripper and the intermediate store are each arranged on a telescopic arm that can be moved in the direction perpendicular to the plane of the workpiece region.

2. The sorting system for the laser cutting machine tool according to claim 1, characterized in that the gripper and the intermediate store are arranged on the telescopic arm by means of a releasable coupling.

3. The sorting system for the laser cutting machine according to claim 1, characterized in that the intermediate store has a sliding device that is configured to push cut parts out of the intermediate store.

4. The sorting system for the laser cutting machine according to claim 1, characterized in that the intermediate store has a contact surface for the cut parts formed from a plurality of tines.

5. A laser cutting machine, configured for separating cut parts from a workpiece having a sorting system according to claim 1.

6. The laser cutting machine according to claim 5, characterized in that a changing station for a changing table is provided and in that the gripper and the intermediate store of the sorting system are arranged on the changing station so as to be movable over the changing table, the changing table corresponding to the workpiece region.

7. A method for sorting cut parts from a workpiece region of a laser cutting machine, by means of a sorting system according to claim 1, the method having the steps of
Moving the gripper to receive a cut part;
Depositing the cut part in the intermediate store;
Moving the intermediate store to the store and unloading the intermediate store.

8. The method for sorting cut parts according to claim 7, characterized in that the moving and the depositing steps are repeated until the intermediate store is filled or all cut parts have been received.

9. The method for sorting cut parts according to claim 7, characterized that the intermediate store follows the movement of the gripper.

\* \* \* \* \*